Jaromír Malešák
INVENTOR.

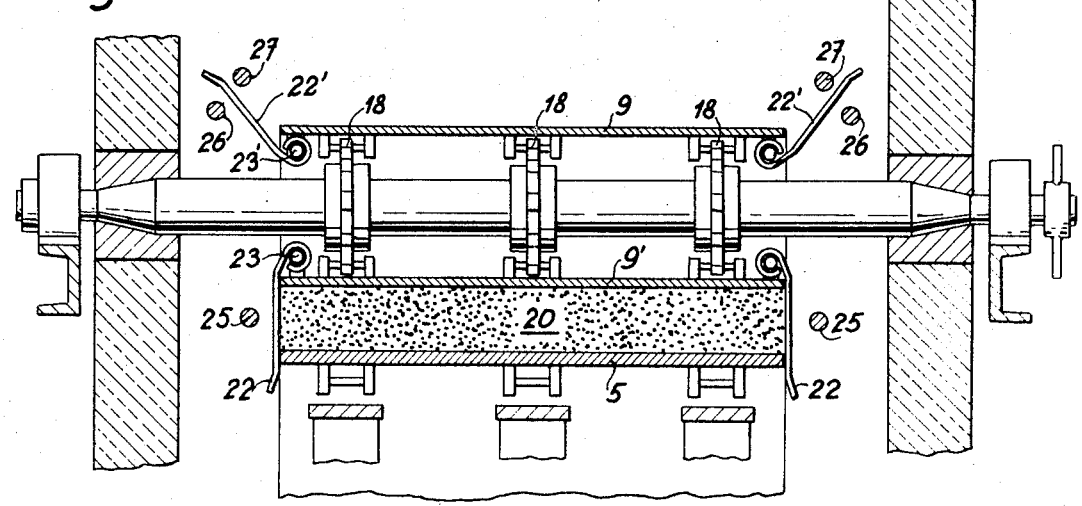
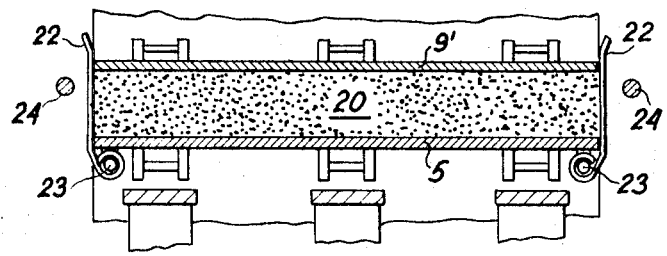
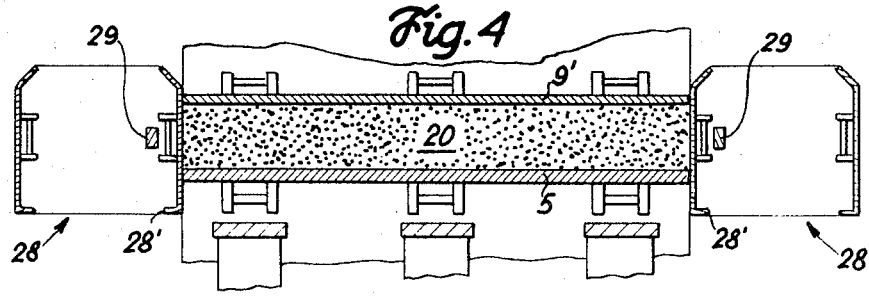
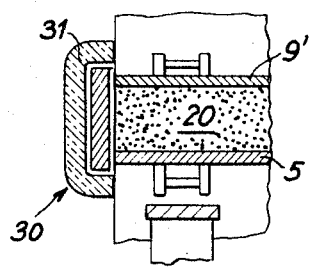
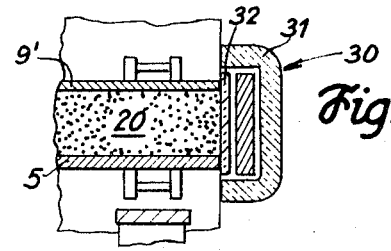

United States Patent Office 3,585,014
Patented June 15, 1971

3,585,014
METHOD AND APPARATUS FOR MANUFACTURING LENGTHS OF FOAM GLASS
Jaromir Malesak, Prague, Czechoslovakia, assignor to Statni vyzkumny ustav sklarske techniky, Prague, Czechoslovakia
Filed May 14, 1968, Ser. No. 729,001
Claims priority, application Czechoslovakia, May 20, 1967, 3,677/67
Int. Cl. C03b 19/08
U.S. Cl. 65—22
12 Claims

ABSTRACT OF THE DISCLOSURE

A method and apparatus for the continuous manufacture of foam glass. Glass powder and a suitable foaming agent are heated to temperatures where the mixture first sinters, then fuses, and then foams, so that the volume of the mixture, as it is continuously conveyed through a heating zone into a cooling zone, will continuously increase during foaming. Initially, the mixture has a mound-shaped cross section, but while it is continuously advanced from the heating zone into the cooling zone compression and shaping is applied to give the foaming glass a rectangular cross section. The compression of the foaming glass is applied to have the glass assume a height from 0.5 to 0.9 of its ultimate height, and while continuing the application of pressure after the final height is reached, the glass is advanced into the cooling zone where this pressure is applied at all sides onto the glass at least during an initial phase of the cooling.

BACKGROUND OF THE INVENTION

The present invention relates to the manufacture of foam glass.

In particular, the invention relates to a method and apparatus for the continuous manufacture of lengths of foam glass.

It is known to manufacture foam glass by heating a mixture of glass powder and a suitable foaming agent while this mixture is transported through a tunnel kiln in which the mixture first sinters, then fuses, and then foams so that its volume increases. In this way an elongated length of glass which is continuously conveyed may initially have a mound-shaped cross section and can be given during its foaming its final cross section.

In order to convert the cross sectional configuration of the glass from its mound-shaped configuration to a rectangular configuration, it is, for example, customary to handle the glass with the upper run of a supporting endless conveyor band carrying the glass, the lower run of an endless shaping band which is situated within the foaming zone of the kiln above the conveyor band, with the top region of the glass being engaged by said lower run, and vertical side walls which are provided to determine the opposed side surfaces of the foam glass. The lower run of the shaping band is conventionally stretched horizontally and its distance from the upper run of the lower conveyor band corresponds to the final height which is to be given to the length of foam glass.

Structures and methods of this type have a number of drawbacks. With one set of conditions, the change of the cross-sectional configuration of the glass from its mound-shaped cross section to its rectangular cross section begins only when the mound-shaped cross section has risen sufficiently to engage the lower run of the shaping band, such rising taking place during the foaming of the glass, so that in this case there is no change from the mound-shaped to the rectangular-shaped cross section until the final height of the glass is reached. With another set of conditions, it is possible for the opposed sides of the glass of the mound-shaped cross section to initially engage the referred to vertical side walls before the top of the glass reaches the lower run of the shaping band so that the glass starts to change its shape from the mound-shaped cross section toward the rectangular cross section before the top surface of the glass has reached its final height. The first set of conditions will be encountered where the mixture is supplied into a space whose width is smaller than the width of the upper run of the conveyor band so as to prevent the overflow of the mass of the mixture after sintering thereof over the edges of the upper run of the conveyor band or in order to prevent the overflow of the foaming glass. The second set of conditions is encountered where the mixture is charged across the entire width of the upper run of the conveyor band so as to initially engage the side walls, and this type of operation can be provided where the side walls prevent the overflow of the mass. From the moment when the foam glass comes into contact with the shaping band, at the lower run of the latter, it will fill in the entire cross section to give the cross section of the glass a rectangular configuration. This latter type of operation can only take place slowly so that a kiln of considerable length and relatively large heat consumption is essential.

When the lower run of the shaping band reaches the end of its horizontal path and turns around an end roller to return along the upper run, while the length of treated glass is still in the foaming zone, the temperatures which prevail in this zone cause the glass to stick to the shaping band, so that the glass clinging to the upper run thereof hardens as this upper run returns to the receiving end of the shaping band to progress to the lower run thereof. The result is that the upper run of the shaping band must be cleaned, which is very difficult since the foam glass sticking to the upper run of the shaping band hardens very quickly.

An additional drawback encountered with conventional constructions resides in the fact that the length of foam glass which advances beyond the shaping band is still foaming because of the elevated temperatures encountered in the region where the shaping band changes its direction, so that even as the glass continues to move beyond the shaping band the foaming continues although there is no longer any shaping pressure acting on the glass. As a result, the height of the foam glass increases without any control.

SUMMARY OF THE INVENTION

It is accordingly a primary object of the present invention to provide a method and apparatus which will avoid the above indicated drawbacks.

More specifically, it is an object of this invention to provide a method and apparatus which will be capable of providing a length of foam glass of precisely determined shape and size.

Another object of my present invention is to provide a construction where the heating kiln can be made shorter than would otherwise be possible.

Still another object of the invention is to provide a construction and method which will enable the treatment of the glass to take place in a far shorter time than has hitherto been possible.

Further, it is an object of this invention to provide a method and apparatus which will greatly reduce the amount of heat required to carry out the operations.

In addition, it is an object of the invention to provide a method and apparatus which will operate very reliably to achieve the desired results at relatively low cost.

In accordance with the invention, the compressive pressure is applied to the foaming glass before the latter reaches its final height, preferably from 0.5 to 0.9 of its final height, so that a rectangular cross section is already achieved during the foaming process. The compressive forces which determine the shaping of the glass are continued during the progress of the glass at least through the initial part of the cooling zone, so that in this way the shaping forces are applied reliably until the foaming action has entirely ceased, thus enabling the final configuration of the glass to be very precisely determined. With the apparatus of the invention, the pressure is applied to the treated glass by a shaping band which extends not only along the heating zone of a kiln in the foaming region thereof, but also from the latter region into at least the initial part of the cooling zone. The lower run of the shaping band is maintained slack and will simply by its own weight engage the upper surface of the foaming glass.

BRIEF DESCRIPTION OF THE DRAWINGS

The invention is illustrated by way of example in the accompanying drawings which form part of this application and in which:

FIG. 2 is a schematic cross section showing how the lower run of a shaping band and the upper run of a conveyor band coact with a side wall means:

FIG. 3 shows another embodiment than FIG. 2, FIG. 3 being a transverse, partly sectional schematic illustration and showing the upper as well as the lower run of the shaping band;

FIG. 4 is a view similar to FIG. 2 but showing another embodiment of a side wall means; and FIGS. 5A and 5B are views also similar to FIG. 2, fragmentarily showing two more embodiments of a side wall means.

DESCRIPTION OF THE PREFERRED EMBODIMENTS

Figure 1:
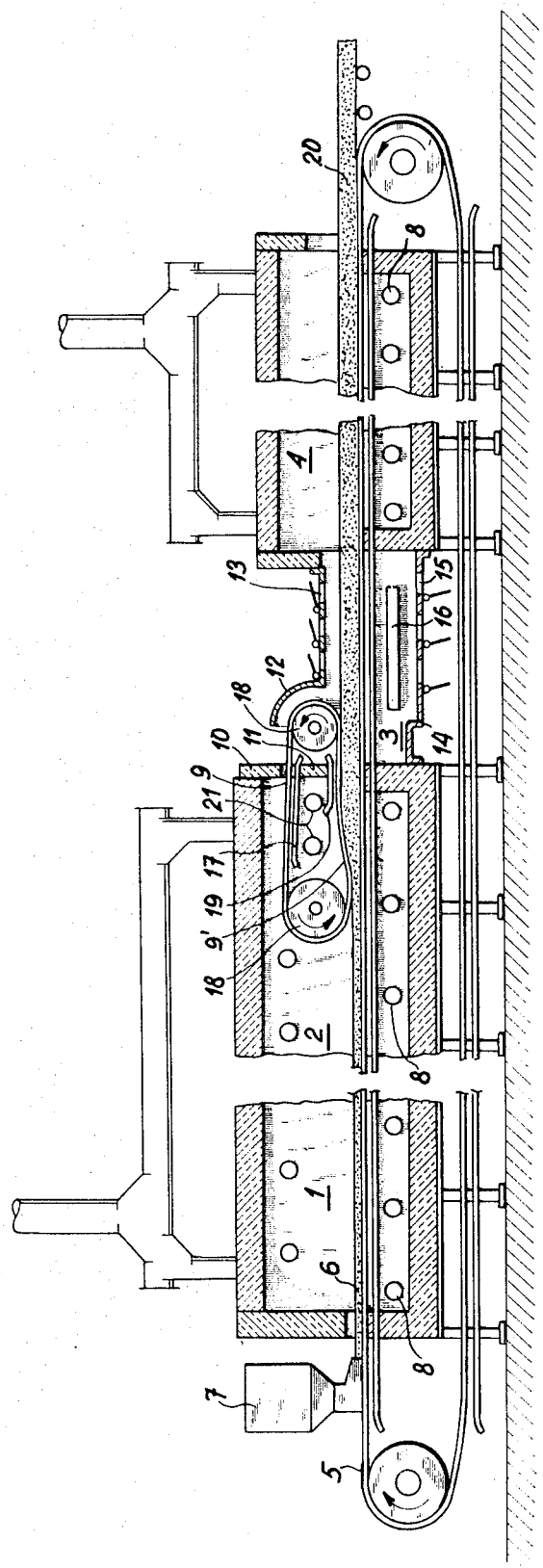
FIG. 1 is a partly sectioned side elevation, schematically illustrating a kiln and the glass-treating structure of the invention for carrying out the method of the invention.

Referring now to the drawings and initially to FIG. 1, there is shown an elongated tunnel kiln having an elongated heating zone composed of a preheating region 1 and a foaming region 2. The heating zone 1, 2 is followed by a cooling zone 3 which in turn is followed by a tempering zone 4 in which stabilization of the glass is achieved by tempering the same.

In order to convey the glass continuously through these zones of the tunnel kiln, and endless supporting conveyor band 5 is provided with the upper run thereof passing through a lower region of the kiln. Thus, it is the upper run of the endless conveyor band 5 which forms the means for supporting the mixture 6 of glass powder and foaming agent which is treated according to the invention. The mass 6 is applied to the upper run of the band 5 just in advance of the inlet of the tunnel kiln by way of a charging assembly 7. Burners 8 are provided within the tunnel kiln beneath the upper run of the band 5 for heating the mass 6 thereon.

An endless shaping band 9 is provided in the foaming region 2 of the heating zone. This band extends from the foaming region 2 into the cooling zone 3 and is situated above the conveyor band 5.

An insulating partition wall means separates the foaming region 2 of the heating zone from the cooling zone 3. This partition wall means has an upper section 10 located above the upper run of the shaping band 9, and a lower section 11 situated between the upper and lower runs of the band 9.

In the cooling zone 3 the kiln is provided with an uninsulated cover 12 covering the top and sides of the kiln. This cover is provided with a plurality of openings 13. At the bottom of the cooling zone 3 there is, however, a heat-insulated cover 14 provided with openings 15. Thus, cooling mediums such as the outer atmosphere can reach the glass through the openings 13 and 15. Above the insulated lower cover 14 is a heating means 16 in the form of a suitable heating element, which is situated just beneath the upper run of the conveyor band 5 in the cooling zone 3. As a result of this construction the cooling in the cooling zone will take place more intensely at the top and side surfaces of the length of glass and less intensely at the bottom surface thereof.

The elongated endless shaping band 9 has, in accordance with a further feature of the invention, a lower run 9' which hangs in a slack fashion between end rollers 18 around which the band 9 is guided, these rollers being driven in any known way so as to continuously move the endless band 9. In the same way, end rollers for the conveyor 5 are driven in any known way. The left roller 18 will be driven in a counterclockwise direction so as to provide a tension pulling the upper run of the band 9 to the left and giving a slack to the lower run of the band 9 as it advances toward the right. The stretched upper run of the band 9 is supported by an elongated guide plate 17 which is situated in a tangential plane of the end drums 18. A lower elongated guide plate 19 extends just below the lower section 11 of the insulating partition wall 10, 11, and the distance of the guide plate 19 from the upper run of the band 5 will determine the final height of the treated glass. This guide plate 19, may, for example, be situated at the elevation which the lower run of the band 9 would have if this lower run were under tension. The guide plate 19 can be adjusted in elevation in any suitable way so as to make it possible to adjust the height of the length of foam glass 20. Burners 21 are situated between the upper and lower runs of the shaping band 9 for heating the material from the top as well as from the bottom.

With the construction shown in FIG. 2, the cross-sectional configuration or profile of the length of glass 20 will be determined not only by the bands 5 and 9 but also by side wall means which in the illustrated example includes a plurality of rectangular or square plates 22 that are supported by bolts or pivot pins 23 fixedly carried by the conveyor band 5 at its outer side edge regions. The plates 22 which form the side wall means of this embodiment are freely swingable on the pivot supports 23 carried by the band 5, and the side wall means includes guide rods 24 supported in the kiln in any suitable way so as to maintain the plates 22 of the side wall means in their vertical positions, while extending upwardly from the upper run of the band 5, to engage the outer edges of the lower run of the band 9. The rods 24 have a suitable configuration for guiding the plates 22 while the band 5 changes its direction when moving between the upper and lower runs.

With this construction of the side wall means, the foaming mixture can be charged across the entire width of the upper run of the conveyor band 5, this structure being of greater advantage than known constructions where the vertical plates are directly fixed to the conveyor band. In known constructions, during the course of change in the direction of the upper run of a conveyor band as it turns to the lower run to return to the inlet end of the tunnel kiln, at the time when the foam glass leaves the conveyor band and continues horizontally beyond the latter, conventional vertical plates act as knives and strike against extensions of the foam glass, which become formed between the vertical plates in the gaps therebetween, thus tearing or breaking away portions of the foam glass in the regions of extensions thereof between successive side plates, with the result that the exterior side surface of the foam glass deteriorates and has a very poor quality. With the construction of the invention, on the other hand, the pins or bolts 23 support the plates 22 for free swinging movement to swing freely from their vertical positions as the upper run of the conveyor band 5 moves around the respective end drum to the lower run thereof. Due to the fact that plates 22 are permitted to swing freely away from the exterior side surfaces of the glass 20, they will not engage and break any side extensions of the glass which may form in spaces between the plates 22.

The structure shown in FIG. 3 is intended to receive initially a charge across a width which is smaller than the total width of the upper run of the conveyor band 5. In this case, too, the side wall means are composed of a plurality of rectangular or square plates 22' swingably supported by pins or bolts 23', but with this embodiment the pivotal supports 23 are carried by the shaping band 9. Supported within the tunnel kiln along the shaping band 9 are guide rods 25, 26 and 27 for the side wall means. These rods are supported as was the case with the rods 24 of FIG. 2 in any suitable way within the kiln so as to extend along the exterior of the side plates 22' in order to control the positions thereof. Thus, while in the case of FIG. 2 the control rods 24 hold the plates 22 against the side edges of the lower run of the band 9, with the embodiment of FIG. 3 the control rods 25 press the plates 22' which hang downwardly from the lower run of the band 9 against the side edges of the upper run of the band 5. With the embodiment of FIG. 2 when the upper run of the band 5 changes its direction and moves into the lower run thereof, the plates 22 simply hang downwardly in the manner shown for the plates 22' hanging from the lower run of band 9 of FIG. 3. As the plates 22' of FIG. 3 approach the end of the lower run of the band 9 and the lower run changes its direction to advance to the upper run, the plates 22' are received between the guide rods 26 and 27 so as to be guided in a manner shown in the upper portion of FIG. 3 while advancing with the upper run of the band 9. In this way by providing the rods 25–27 of FIG. 3 and the rods 24 of FIG. 2, with suitable locations and shapes, particularly at their ends, it is possible to guide the side plates 22 and 22' of the side wall means so that they will function in the manner indicated in FIGS. 2 and 3.

According to the embodiment of the invention which is illustrated in FIG. 4, the side wall means taken the form of a pair of endless side bands 28, the inner side runs 28' of which are directed toward each other for engaging the outer side edges of the lower run of the upper band 9 and the upper run of the lower band 5, so that continuously moving the inner side runs 28' will form the structure which determines the configuration of the side surfaces of the glass. Guide strips 29, with suitable rollers, are used to engage the inner side runs 28' at their inner surfaces for holding these inner runs against the side edges of the lower run of band 9 and upper run of band 5. With a construction as shown in FIG. 4 it is possible to charge the mixture onto the band across a width which is greater than is possible with the construction of FIG. 3. The endless bands 28 may be longer than the band 9 and may extend along the interior of the heating zone through a given distance in advance of the band 9 so as to engage the exterior side edges of the upper run of the band 5 before the glass reaches the shaping band 9 to prevent in this way any overflow of the foaming glass.

FIGS. 5A and 5B show two embodiments of side wall constructions which are considerably simplified and rendered more stable since the side wall means of both embodiments have no moving parts. The side wall means or portions thereof may take the form of elongated cooling walls 30 provided on their exterior surfaces with a suitable heat insulation 31, so that with such an arrangement suitable cooling can be achieved, where desired, directly by means of the walls 30 through which any desired cooling medium may flow in suitable conduits. In the construction of FIG. 5B, the wall 30 is shown to be provided with a graphite coating 32 at the surface which engages the edges of the lower run of the band 9 and the upper run of the band 5.

It is believed that the method of my invention as well as the construction and operation of preferred forms of apparatus for practicing the invention, and the many advantages thereof, will be understood from the foregoing detailed description. Some of the features and advantages of the invention are reviewed hereinafter.

The upper run of the conveyor band 5 is charged with the mixture of glass powder and foaming agent and is heated by burners or other known heating means in a known way, so as to achieve sintering, fusing, and foaming of the mixture and an increase of its volume. The slack lower run 9' of the shaping band 9 engages and compresses the advancing foam glass of mound-shaped cross section so that as the height of the latter increases an increasing pressure is generated in the foaming mass by the slack lower run of the shaping band 9, until the foaming mass quickly fills the entire rectangular cross sectional shape determined by the bands 5 and 9 and the side wall means. After the entire cross-sectional space is filled at a height which is less than the final total height of the glass length 20, as limited by the slack lower run of the shaping band 9, increasing pressure of the foaming mass itself lifts the lower slack run of the band 9 until it reaches and engages the guide plate 19 which is precisely located at an elevation which will determine the ultimate height of the glass 20.

During the initial part of the cooling phase, at least approximately up to the location where the foaming terminates due to the decrease in the ambient temperature, the compressive pressure is continued all around the exterior surface of the advancing foam glass so that its cross-sectional configuration is still reliably maintained by the bands 5 and 9 and the side wall means of the invention. Therefore, any possible increase in the cross-sectional size of the length of foam glass as it moves beyond the shaping band 9 is reliably avoided since this band together with the side wall means and the upper run of the lower band 5 still continues to engage the glass as the glass progresses through the initial region of the cooling zone where the foaming action diminishes and ceases. Thus, a hard thickness of the glass will form in the outer region of the glass due to the setting thereof during the cooling in the cooling zone.

As a result of a rapid cooling which takes place in the cooling zone as the glass moves beyond the band 9, any bubbles which are within the foam glass could shrink, causing a deformation and possible crackling of the surface of the foam glass. This latter drawback is reliably avoided due to the invention by controlling the cooling and retarding the rate thereof particularly in the lower regions of the glass, as compared to the upper regions thereof, by maintaining and equalizing pressure at the internal regions of the foam glass which are still in a plastic condition until the moment when a sufficiently hard core has formed to reliably prevent both swelling and shrinking of the glass. This retarding of the cooling is achieved by the lower heating means 16 at the cooling zone.

After cooling has taken place the glass is guided through the tempering zone so that it will be stabilized in a known manner.

The slack lower run 9' of the shaping band 9 will engage the top surface of the foaming glass before it reaches its final height, and it is preferred to provide this engagement with the top surface of the foaming glass to cause the latter to assume 0.5 to 0.9 of its final height, so that in this way the rectangular cross section of the glass is achieved during the foaming thereof and the height of the glass increases during constant application of compressive pressure thereto with this pressure continued during at least the initial part of the cooling phase.

It is to be noted that as the height of the foaming glass increases the pressure with which the slack lower run 9' of the band 9 engages the glass will automatically increase. Of course, as the foaming continues there will be an increasing pressure opposing the lower run 9' of the shaping band to raise it until it engages the guide plate 19.

With the method and apparatus of the invention it is thus possible to provide an exceedingly rapid shaping of the foaming mass by the compression thereof, so that as a result the time required for the treatment is considerably shortened as compared to conventional methods, and in addition as a result of this latter advantage it is possible to reduce the extent of heat consumption and it is also possible to shorten the length of the entire kiln.

Because the pressure is continued on the glass until the foaming ceases, the final shape of the glass is very precisely determined. Furthermore, the separation of the lower run of the shaping band 9 from the top surface of the foam glass is rendered far easier and without any possible sticking due to the extension of the band 9 into the cooling zone where the prevailing temperature at the surface of the shaping band 9 and the foam glass is below that at which sticking of the glass to the shaping band can occur.

It will be apparent that while I have shown and described my invention in a few forms only, many changes and modifications may be made without departing from the spirit of the invention defined in the following claims.

I claim:

1. In a method for continuously manufacturing a length of foam glass, the steps including heating a mixture of glass powder and a foaming agent on a continuously moving support to temperatures where the mixture first sinters, then fuses and foams increasing its volume into a mound-shaped cross section, limiting the moving length of glass on both sides, forming said moving glass in a substantially vertical direction into a rectangular cross section, and cooling the foamed glass after the final height thereof has been reached, in which the improvement comprises the steps of first compressing the mound-shaped strip into a rectangular cross section of 0.5 to 0.9 of its final height, then, while continuing to compress the glass, letting the increasing pressure of gases in the foaming mass itself gradually overcome the force of the compressing means, permitting the rectangular strip to reach its final height under the influence of its increasing gaseous pressure, holding the finally shaped glass in the shaping means during at least an initial phase of the cooling so as to prevent its further increase in the cross section and its sticking to the shaping means.

2. In a method as recited in claim 1 and wherein during the cooling of the glass the upper side surfaces thereof are cooled more intensely than a lower surface thereof.

3. In an apparatus for continuously manufacturing a length of foam glass an elongated tunnel kiln wherein a mixture of glass powder and foaming agent are to be heated and then cooled and tempered, said kiln having an elongated heating zone in which preheating and foaming take place, a cooling zone subsequent to said heating zone, a tempering zone subsequent to said cooling zone for stabilizing the length of foam glass, and a partition wall means separating said heating zone from said cooling zone, an elongated endless conveyor band having an upper run extending continuously through said zones for transporting glass therethrough during the processing thereof, and endless shaping band situated above said conveyor band, side wall means coacting with said upper run of said conveyor band and said lower run of said shaping band to provide the processed glass with a rectangular cross section, in which the improvement consists in said shaping band having a tensioned upper run and a slack lower run and being situated partly in said heating zone and partly in at least an initial portion of said cooling zone, said partition wall means having an upper section above said shaping band and a lower section situated between said upper and lower run of said shaping band, and a guide plate extending along and situated above said lower run of said shaping band and extending below said lower section of said insulating partition wall means whereby the final height of the glass will be determined by the elevation of said guide plate.

4. The combination of claim 3 and wherein said kiln has an exterior uninsulated cover at the top and sides of said cooling zone, said cover being formed with openings, and said kiln having at the bottom of said cooling zone a heat-insulated cover also formed with openings.

5. The combination of claim 4 and wherein a heating means is situated in said cooling zone above said heat-insulated cover at the bottom of said cooling zone.

6. The combination of claim 3 and wherein said side wall means includes a plurality of rectangular plates swingably carried by said conveyor band at outer side edge regions thereof, and guide rods coact with said plates at said upper run of said conveyor band for maintaining said plates which extend from said upper run in substantially vertical positions engaging side edges of the lower run of said shaping band.

7. The combination of claim 3 and wherein said side wall means includes a plurality of rectangular plates, means for swingably carrying said rectangular plates on said shaping band at outer side edge regions thereof and guide rods coact with said plates for maintaining the latter at said lower run of said shaping band in engagement with edges of the upper run of said conveyor band, said guide rods guiding said rectangular plates during turning of said shaping band between the upper and lower runs thereof.

8. The combination of claim 3 and wherein said side wall means includes a pair of endless bands having inner runs directed toward each other and between which said lower run of said shaping band and said upper run of said conveyor band are located, said inner runs of said endless bands engaging the side edges of said lower run of said shaping band and said upper run of said conveyor band.

9. The combination of claim 3 and wherein said side wall means includes cooling walls having external surfaces directed away from said bands and carrying insulation.

10. The combination of claim 3 and wherein a heating means is located between the upper and lower runs of said shaping band in a foaming region of said heating zone.

11. The combination of claim 9 and wherein said cooling walls have surfaces directed toward the side edges of the lower run of the shaping band and the upper run of the conveyor band, said surfaces carrying graphite coating.

12. The combination of claim 3 and wherein another elongated guide plate extends along and underneath a stretched upper run of said shaping band to support same.

References Cited

UNITED STATES PATENTS

| 2,310,457 | 2/1943 | Owen | 65—22 |
| 3,056,184 | 10/1962 | Blaha | 65—22 |
| 3,266,880 | 8/1966 | Pilkington | 65—99 |
| 3,300,289 | 1/1967 | Long | 65—22 |
| 3,473,904 | 10/1969 | Kraemer | 65—22 |

ARTHUR D. KELLOGG, Primary Examiner

U.S. Cl. X.R.

65—20, 99, 144